(12) United States Patent
Liu

(10) Patent No.: US 12,485,359 B1
(45) Date of Patent: Dec. 2, 2025

(54) RATCHET WINDING MECHANISM AND AN OUTDOOR SPORTS OUTFIT

(71) Applicant: Yuxuan Liu, Jiangsu (CN)

(72) Inventor: Yuxuan Liu, Jiangsu (CN)

( * ) Notice: Subject to any disclaimer, the term of this patent is extended or adjusted under 35 U.S.C. 154(b) by 0 days.

(21) Appl. No.: 18/953,663

(22) Filed: Nov. 20, 2024

(51) Int. Cl.
*A63G 21/00* (2006.01)
*A63G 21/22* (2006.01)
*F16G 11/12* (2006.01)

(52) U.S. Cl.
CPC .............. *A63G 21/22* (2013.01); *F16G 11/12* (2013.01)

(58) Field of Classification Search
None
See application file for complete search history.

(56) References Cited

U.S. PATENT DOCUMENTS

| | | | | |
|---|---|---|---|---|
| 9,751,450 B1* | 9/2017 | Zhou | ........................ | B60P 7/083 |
| 10,065,554 B1* | 9/2018 | Xia | ........................ | B60P 7/083 |
| 11,313,437 B1* | 4/2022 | Williams | ................ | B60P 7/083 |
| 11,698,102 B1* | 7/2023 | Huang | .................... | B60P 7/083 |
| | | | | 384/322 |
| 2014/0130317 A1* | 5/2014 | Bermes | .................. | B25B 25/00 |
| | | | | 24/68 CD |
| 2014/0183427 A1* | 7/2014 | Chang | .................... | B60P 7/083 |
| | | | | 254/218 |
| 2018/0187441 A1* | 7/2018 | Underwood | ........... | E04H 4/143 |
| 2018/0334075 A1* | 11/2018 | Frank | ................. | A61B 17/1327 |
| 2019/0255983 A1* | 8/2019 | Zhou | .................... | B65H 54/585 |
| 2021/0179379 A1* | 6/2021 | Zhang | ................... | B65H 23/04 |

* cited by examiner

*Primary Examiner* — Emmanuel M Marcelo

(57) ABSTRACT

A ratchet winding mechanism, comprising a fixed bracket, one end of said fixed bracket being a connecting end, and its other end being a winding end; a winding shaft, said winding shaft being rotatably mounted at the winding end of fixed bracket, through which wire line is wound; at least two ratchets, said ratchets being fixedly mounted on two sides of said winding shaft, and space between two ratchets forming a winding space; an elastic limiting member, one end of said elastic limiting member being fixed to said fixed bracket, another end of said elastic limiting member being snapped into tooth grooves of said ratchets for restricting circular movement of said winding shaft, and completing winding of said wire line by unidirectional rotation of said winding shaft.

4 Claims, 4 Drawing Sheets

RATCHET WINDING MECHANISM AND AN OUTDOOR SPORTS OUTFIT

TECHNICAL FIELD

The invention relates to the technical field of outdoor sports devices, in particular to a ratchet winding mechanism and an outdoor sports outfit.

BACKGROUND ART

In outdoor sports, wire lines are widely used in high altitude zip lining, adventure sliding and other activities. The common application is to fix two ends of the wire line on two support points at different heights, such as trees, rock walls, etc., with one end higher, another end lower; the user holds the wire line through an auxiliary functional part, sliding from the high end to the low end, to complete the gliding movement. This outdoor activity is challenging and exciting, but at the same time, it also puts forward high requirements for the installation and tightening of the wire line.

Most of the traditional wire line winding and tightening devices are manually adjusted, which is cumbersome to operate and difficult to control accurately. The untightened wire line may affect safety and smoothness of the movement, while the existing devices often lacks an effective self-locking function, which cannot automatically fix the tension of the wire line after tightening, and is prone to loosening, which increases the potential safety hazards.

SUMMARY OF THE INVENTION

In order to solve the above problem, the invention provides a ratchet winding mechanism, by setting unidirectional rotating ratchets and an elastic limiting member, the mechanism is capable of realizing rapid tightening of a wire line and automatically completing self-locking after tightening, so as to safeguard stability and safety of the wire line.

The invention is realized by the following technical solution: a ratchet winding mechanism, including a fixed bracket, wherein one end of said fixed bracket is a connecting end, and its other end is a winding end;
  a winding shaft, said winding shaft being rotatably mounted at the winding end of said fixed bracket, through which the wire line is wound;
  at least two ratchets, said ratchets being fixedly mounted on two sides of said winding shaft, and the space between two ratchets forming a winding space;
  an elastic limiting member, one end of said elastic limiting member being fixed to said fixed bracket, another end of said elastic limiting member being snapped into tooth grooves of said ratchets for restricting circular movement of said winding shaft, and completing winding of said wire line by unidirectional rotation of said winding shaft.

As a preferred technical solution, said winding shaft is provided with a fixing hole, one end of the wire line being snapped into said fixing hole, and said wire line is partially coiled on said winding shaft.

As a preferred technical solution, said ratchets are provided with ratchet teeth, a tooth groove is formed between adjacent ratchet teeth, and said ratchets follow the winding shaft to make circular rotational movement.

As a preferred technical solution, two ends of said winding shaft extend to an outside of two ends of said fixed bracket respectively, and its extending end thereof forms a driving end, which manually drives rotation of said winding shaft or electrically drives rotation of said winding shaft.

An outdoor sports outfit of the invention comprises a ratchet winding mechanism and a wire line, one end of said wire line being provided with a connecting head, and another end thereof being wound on said winding shaft.

As a preferred technical solution, a detachable connecting buckle is provided on one side of said ratchet winding mechanism away from said wire line.

As a preferred technical solution, another end of said connecting buckle is connected with an elongated connecting segment.

As a preferred technical solution, said wire line is provided with a buffer mechanism on one side, and said wire line is also slidably provided with functional auxiliary members; said functional auxiliary members are capable of sliding along the wire line 2 from a high end to a low end, and said buffer mechanism is set at the low end of said wire line.

As a preferred technical solution, said buffer mechanism comprises a spring and spring locking straps provided on both sides of the spring, said spring being sleeved on positioning sleeves on an outside of said wire line, said spring locking straps being sleeved on the outside of said wire line and used to lock said spring to the positioning sleeves.

The beneficial effect of the present invention is that: through the unidirectional rotation design of the ratchets, the invention is able to rapidly wind up the wire line in a single direction and realize automatic fixation by using the self-locking function of the ratchets, avoiding the cumbersome steps of the traditional manual operation and inaccurate loosening and tightening control. The elastic limiting member of the winding mechanism can effectively limit reverse movement of the winding shaft, thus ensuring that the wire line is always kept in the appropriate tension state, increasing the stability and safety of sliding movement;

In addition, the invention can be operated by a simple manual or electric drive method, which greatly improves installation and adjustment efficiency of the outdoor sports equipment, enables the user to complete the preparation work more quickly, enhances smoothness of the movement and experience feeling, and at the same time ensures safety of the movement process.

BRIEF DESCRIPTION OF DRAWINGS

In order to more clearly illustrate the technical solutions in the embodiments or prior art of the invention, the drawings to be used in the description of the embodiments or prior art will be briefly described below, and it will be apparent that the accompanying drawings in the following description are only some embodiments of the invention.

As shown in the accompanying drawings.

5—ratchet winding mechanism, 51—fixed bracket, 53—winding shaft, 54—ratchet, 52—elastic limiting member, 56—fixing hole, 55—ratchet teeth, 1—connecting head, 6—connecting buckle, 7—elongated connecting segment, 4—spring, 10—spring locking strap, 3—first functional auxiliary member, 8—second functional auxiliary member, 2—wire line, 9—positioning sleeve.

SPECIFIC EMBODIMENT OF THE INVENTION

All features disclosed in this specification, or all steps in a method or process disclosed, may be combined in any manner except for mutually exclusive features and/or steps.

Any of the features disclosed in this specification (including any claims, abstract, and drawings), unless specifically recited, may be replaced by other equivalent or alternative features having similar purposes. That is, unless specifically recited, each feature is but one example of a series of equivalent or similar features.

Figure 2:
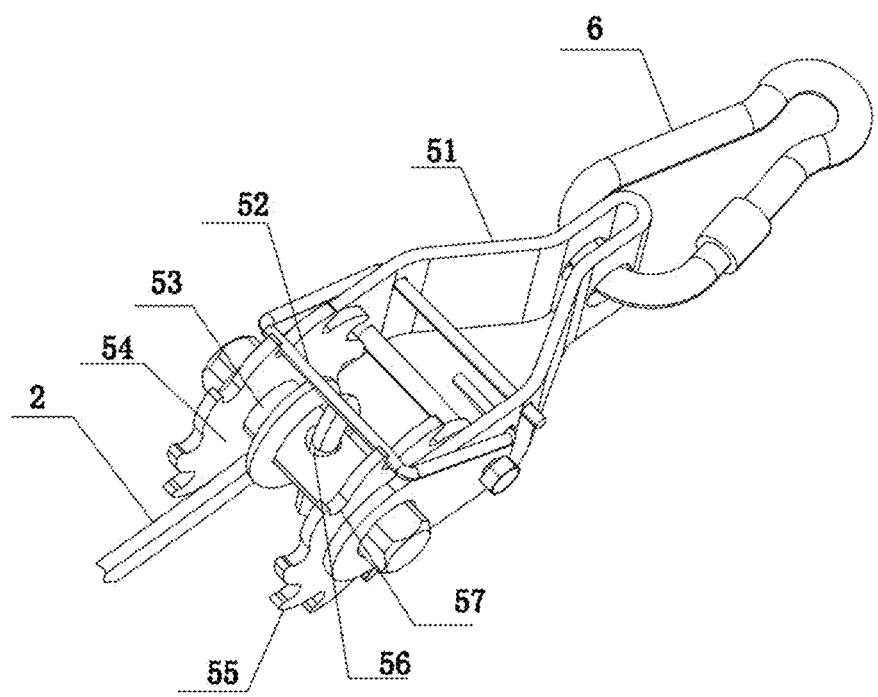
FIG. 2 is a first structural diagram of the ratchet winding mechanism provided by the invention.
Figure 3:
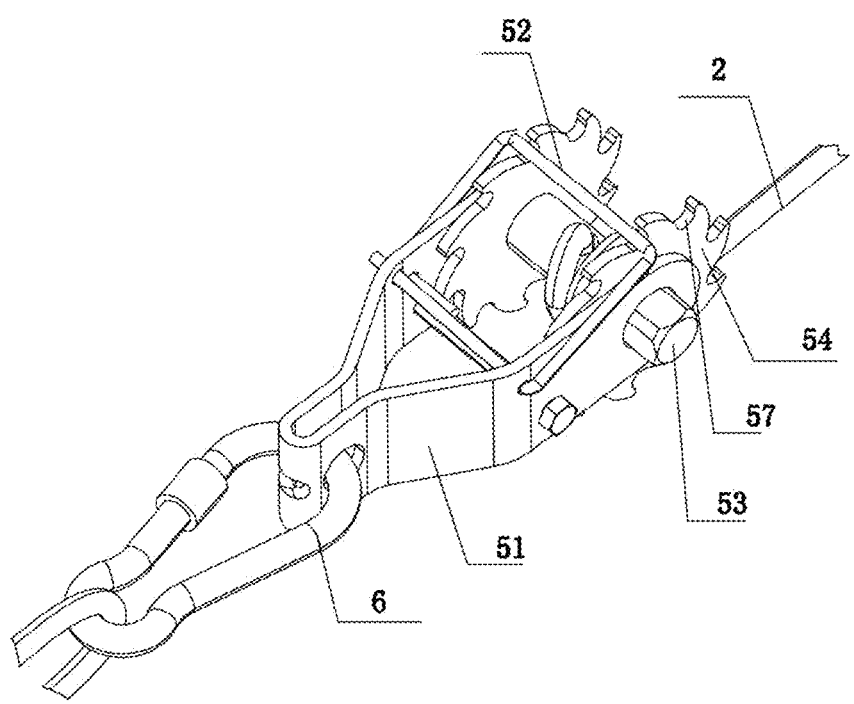
FIG. 3 is a second structural diagram of the ratchet winding mechanism provided by the invention.

As shown in FIG. 2 and FIG. 3, a ratchet winding mechanism 5, including a fixed bracket 51, wherein one end of said fixed bracket 51 is a connecting end, and its other end is a winding end;

it also includes a winding shaft 53, said winding shaft 53 being rotatably mounted at the winding end of said fixed bracket 51, through which the wire line 2 is wound; when the winding shaft 53 is rotated, the wire line 2 can be wound up, so when one end of the wire line 2 is locked, another end can be wound up by the winding shaft 53 until both ends of the wire line 2 are tightened;

it also includes two ratchets 54, said ratchets 54 being fixedly mounted on two sides of said winding shaft 53, and the space between two ratchets 54 forming a winding space; when the winding shaft 53 winds and rotates, the ratchets 54 can complete rotation, following the winding shaft 53 to achieve synchronized circular movement; when the winding shaft 53 is rotated, the wire line 2 can be wound up, so when one end of the wire line 2 is locked, the other end can be wound up by the winding shaft 53 until both ends of the wire line 2 are tightened;

it also includes an elastic limiting member 52, one end of said elastic limiting member 52 being fixed to said fixed bracket 51, another end of said elastic limiting member 52 being snapped into tooth grooves of said ratchets 54 for restricting circular movement of said winding shaft 53, and completing winding of said wire line 2 by unidirectional rotation of said winding shaft 53; when the ratchets 54 rotate, due to the counterclockwise rotation, even if the elastic limiting member 52 contacts the ratchets 54, the ratchets 54 can also rotate counterclockwise, as shown in FIG. 2, accordingly, when the ratchets 54 rotates counterclockwise, the elastic limiting member 52 will elastically deform, and after the completion of the rotation, the elastic limiting member 52 will again be compressed with the ratchets 54 and fastened to the tooth grooves to complete limitation; in clockwise rotation, self-locking can be completed due to the ratchet teeth 55 characteristics, and ratchets 54 cannot rotate reversely, thereby completing automatic locking of the wire line 2.

Wherein, said winding shaft 53 is provided with a fixing hole 56, one end of the wire line 2 being snapped into said fixing hole 56, and said wire line 2 is partially coiled on said winding shaft 53; snapping the wire line 2 into the fixing hole 56 allows the wire line 2 to be better connected to the winding shaft 53, preventing it from coming loose.

Wherein, said ratchets 54 are provided with ratchet teeth 55, a tooth groove is formed between adjacent ratchet teeth 55, and said ratchets 54 follow the winding shaft 53 to make circular rotational movement; the elastic limiting member 52 can be snapped into to a bottom surface of tooth grooves via tooth grooves of the ratchet teeth 55, so that the ratchets 54 cannot be returned to its original position to achieve self-locking.

Wherein, two ends of said winding shaft 53 extend to an outside of two ends of said fixed bracket 51 respectively, and its extending end thereof forms a driving end, which manually drives rotation of said winding shaft 53 or electrically drives rotation of said winding shaft 53; when there is a need to rotate the winding shaft 53, we can add a handle to the driving end of the winding shaft 53, so that manual rotation of the handle can rotate the winding shaft 53 to complete the winding action, when the driving end is connected to the motor, a motor can be used to drive the rotation.

Figure 1:
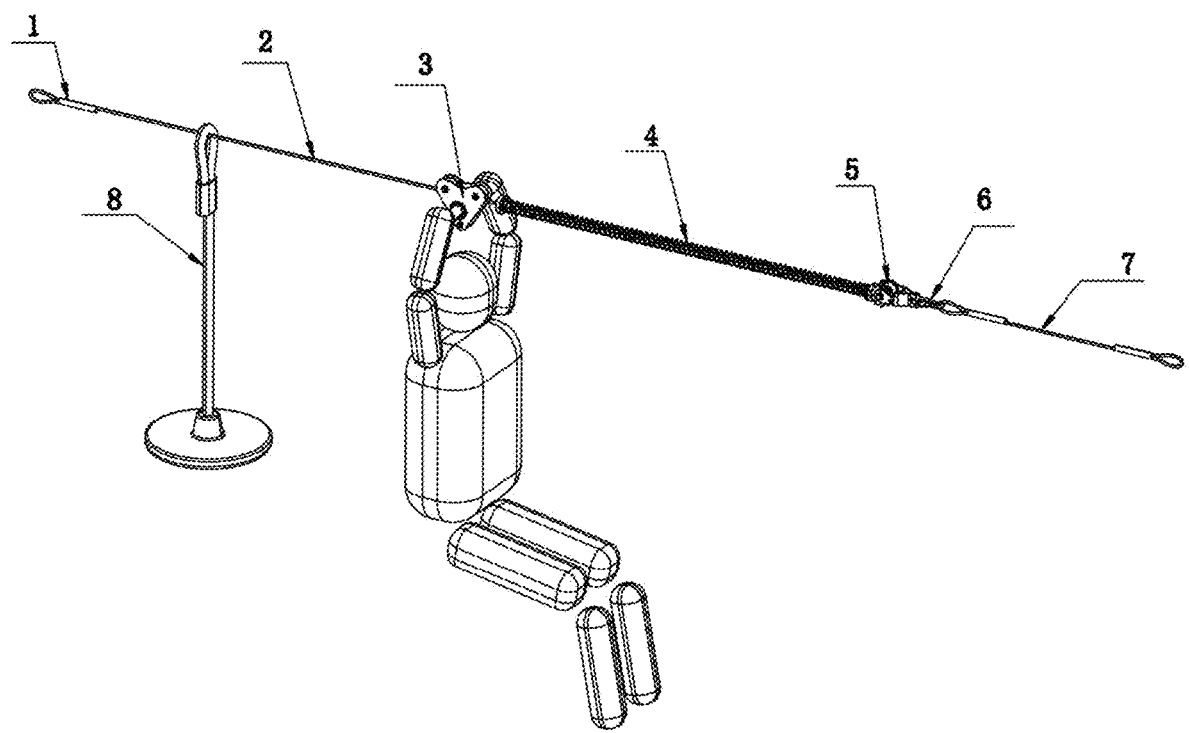
FIG. 1 is the overall effect of the use of the invention.

As shown in FIG. 1, an outdoor sports outfit of the invention comprises a ratchet winding mechanism 5 and a wire line 2, one end of said wire line 2 being provided with a connecting head 1, and another end thereof being wound on said winding shaft 53.

A detachable connecting buckle 6 is provided on one side of said ratchet winding mechanism 5 away from said wire line 2; the connecting buckle 6 can be disassembled, loosen screws on the connecting buckle 6 can detach connecting buckle 6 to complete quick disassembly.

Wherein, another end of said connecting buckle 6 is connected with an elongated connecting segment 7.

Figure 4:
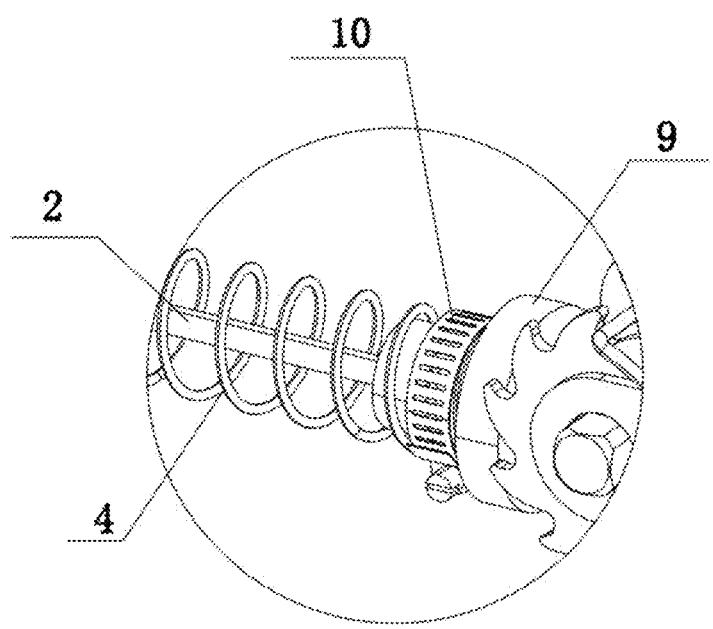
FIG. 4 is a partial enlarged view of the buffer mechanism provided by the invention.

As shown in FIG. 4, said wire line 2 is provided with a buffer mechanism on one side, and said wire line 2 is also slidably provided with functional auxiliary members; said functional auxiliary members are capable of sliding along wire line 2 from a high end to a low end of said, and said buffer mechanism is set at the low end of said wire line 2; said buffer mechanism comprises a spring 4 and spring locking straps 10 provided on both sides of the spring 4, said spring 4 being sleeved on positioning sleeves 9 on an outside of said wire line 2, said spring locking straps 10 being sleeved on the outside of said wire line 2 and used to lock said spring 4 to the positioning sleeves 9.

When used, the person can slide along the wire line 2 from the high end to the low end via operating the functional auxiliary members, and performs buffer stop after encountering the buffer mechanism; in this embodiment, the functional auxiliary members can include a first functional auxiliary member 3 and a second functional auxiliary member 8, of course, more functional auxiliary members can be used to cooperate with the whole equipment use; in FIG. 1, the user's hands hold the handles at two sides of the functional auxiliary member, the feet rise to the sky, then the user can slide along the wire line 2 from the high end to the low end. Accordingly, different experience effects can be realized when using different functional auxiliary members.

What is claimed is:

1. An outdoor sports outfit, comprising a ratchet winding mechanism and a wire line, the ratchet winding mechanism comprising a fixed bracket, wherein one end of said fixed bracket is a connecting end, and its other end is a winding end;

a winding shaft, said winding shaft being rotatably mounted at the winding end of said fixed bracket, through which the wire line is wound;

at least two ratchets, said ratchets being fixedly mounted on two sides of said winding shaft, and a space between two ratchets forming a winding space;

an elastic limiting member, one end of said elastic limiting member being fixed to said fixed bracket, an other end of said elastic limiting member being snapped into tooth grooves of said ratchets for restricting circular movement of said winding shaft, and completing winding of said wire line by unidirectional rotation of said winding shaft;

one end of said wire line being provided with a connecting head, and an other end thereof being wound on said winding shaft;

wherein said wire line is provided with a buffer mechanism on one side, and said wire line is also slidably provided with functional auxiliary members; said functional auxiliary members are capable of sliding along a high end to a low end of said wire line, and said buffer mechanism is set at the low end of said wire line.

2. The outdoor sports outfit of claim 1, wherein a detachable connecting buckle is provided on one side of said ratchet winding mechanism away from said wire line.

3. The outdoor sports outfit of claim 2, wherein an other end of said connecting buckle is connected with an elongated connecting segment.

4. The outdoor sports outfit of claim 1, wherein said buffer mechanism comprises a spring and spring locking straps provided on both sides of the spring, said spring being sleeved on positioning sleeves on an outside of said wire line, said spring locking straps being sleeved on the outside of said wire line and used to lock said spring to the positioning sleeves.

* * * * *